3,235,460
CALCULUS-INHIBITING CHEWING GUM CONTAINING PANCREATIN

John J. Ennever, Cincinnati, Ohio, assignor to The Procter & Gamble Company, Cincinnati, Ohio, a corporation of Ohio
No Drawing. Filed Jan. 15, 1963, Ser. No. 251,489
3 Claims. (Cl. 167—93)

This application is a continuation-in-part of copending application Serial No. 15,517, filed March 17, 1960, now abandoned.

This invention relates to an enzymatically active chewing gum composition. More particularly, it relates to a chewing gum composition which contains pancreatin and is capable of inhibiting the formation of dental calculus.

To a greater or lesser extent, everyone is subject to the formation of an unsightly and irritating substance on the dental surfaces, commonly referred to as calculus or tartar. It is an irritant and is frequently responsible for the initiation of gingival inflammation.

This substance, for the most part, consists of calcium phosphate arranged in a hydroxyapatite crystal lattice structure similar to bone, enamel and dentine. In addition to this inorganic component, calculus contains an organic component which consists of desquamated epithelial cells, leukocytes, food debris and various types of microorganisms such as bacteria and related forms. This organic matrix is very likely the foundation of calculus.

Calculus is difficult to remove, hence, ordinary oral hygienic procedures are generally inadequate for this purpose. Oral hygiene may influence the amount of calculus formation, but does not determine whether or not the formative process will be initiated.

Various dentifrices have been prepared which purportedly have calculus removal or inhibiting capacities. Some of these dentifrices contain proteolytic enzymes designed to catalyse the digestion of the organic matrix within which calculus develops. Still others are designed to decalcify calculus and effect its removal in this way. These represent two of the more feasible approaches to calculus reduction, i.e., attack of the inorganic components of calculus on the one hand and attack of the organic portion on the other.

The forementioned proteolytic enzyme-containing dentifrices are subject to certain disadvantages which preclude their use in a commercial product. In general, they are not stable and diminish in enzymatic activity in a relatively short period of time. Further, the enzymes employed are of a relatively low degree of activity initially, and in order to effect even a minor degree of calculus inhibition they must be used in high concentrations and for substantial time intervals each day. This requirement, of course, precludes satisfactory administration of the substance in a conventional vehicle such as dentifrice powders and paste, mouth wash, chewing gum, and the like.

The decalcifying dentifrices heretofore used, on the other hand, actually reduce calculus formation when used in the prescribed manner. Unfortunately, decalcification by these substances is not selective and the dental surfaces, as well as the calculus, are attacked. Even partial decalcification of the enamel is not permissible since the teeth may, thereby, be rendered more susceptible to caries.

An object of this invention is to provide a novel enzyme-active composition which will inhibit the formation of dental calculus.

A further object is to provide an enzyme active composition which has high levels of initial activity and maintains this activity for prolonged periods of time.

Another object is to provide a composition having a calculus inhibiting capacity and which can be used effectively without modification of ordinary oral hygienic procedures.

Another object is to provide a calculus inhibiting composition which is effective, yet will not harm the tooth structure.

Still another object is to prepare an enzymatically active chewing gum having calculus inhibiting capacity.

Other objects and improvements will become apparent from the following specification.

In general, this invention comprises a chewing gum containing at least about 0.1% of a pancreatin, commercially prepared and marketed under the trade name "Viokase" by Viobin Corp., said chewing gum being essentially free of gum softeners as more fully set forth below. If less than 0.1% of Viokase is used, there is little observable calculus inhibiting tendency. More than 10% of this substance may be used if desired, but such practice would be uneconomical and may present palatibility problems.

Pancreatin is obtained from the fresh pancreas of hog or ox and contains a mixture of proteolytic, glycolytic and lipolytic enzymes. To secure the best yield of a stable material for use in the present invention the pancreatic tissue must be treated with considerable care and must not be subjected to high temperatures.

Wherever herein or in the claims a reference to pancreatin appears it is meant to indicate the commercial product Viokase which is a dehydrated pancreatic tissue which has been simultaneously defatted and dried at low temperatures in accordance with the basic process described in U.S. Letters Patent 2,503,313, and the improved process of U.S. Letters Patent 2,619,425. These processes comprise mixing raw pancreas with a water immiscible fat solvent, distilling the azeotrope from the suspended substance at a temperature below 60° C., and removing a major part of the water. Care must be taken to maintain at all times sufficient liquid solvent in contact with the pancreatic tissue to dissolve the fat contained therein and to maintain the solid particles in solution. The liquid solution of fat and solvent is then separated from the substance thus formed. This substance is characterized by high levels of enzymatic activity and is stable over long periods of time.

It has been found that Viokase is capable of catalyzing the hydrolysis of the organic matrix, the probable foundation of calculus, when incorporated in a suitable carrier. Since the anti-calculus activity of Viokase is, in part, a function of time of exposure, a relatively long exposure is dictated. This cannot be achieved with a carrier such as a dentifrice where exposure time is very limited. Consequently, some carrier where extended contact with the tooth surfaces is achieved must be used. It has been found that chewing gum which is compatible with Viokase accomplishes this purpose without damaging the tooth structure, and without necessitating modification of oral hygienic procedure. Sufficient exposure is accomplished, for example, by chewing a standard five stick package of this gum, chewing each stick about 5 minutes, for a total exposure of about 25 minutes each day.

The mechanism of calculus formation is not known, and it is to be understood that any theoretical considerations expressed here are not to be considered binding. There appears to be substantial agreement among dental authorities that oral microorganisms play a primary role in its formation and constitute in large part the organic portion of the calcareous mass (Glickman, "Clinical Periodontology," W. B. Saunders, Phil., 1953). By eliminating the organic material which provides the media for microbial growth, the foundation of the calculus is destroyed or minimized. This is believed to be the principle upon which this invention operates. The enzyme active component of this composition catalyzes the hydrolysis of the protein and other organic matter, thereby, reducing available microbial supporting media and microorganism concentration and build-up at the pre-calculus site.

A typical chewing gum base is generally comprised of a resilient substance or mixtures of such substances and texture modifiers such as softeners or plasticizers. The resilient substances are usually synthetic resins such as hydrogenated ester gum, polymerized ester gum and polyvinyl acetate; natural gum, such as chicle, natural rubber, gutta katian and gutta soh; and natural and refined waxes such as carnauba wax, candelilla wax, refined paraffin wax and refined microcrystalline wax.

Certain softeners adversely affect the stability of Viokase and are to be avoided. These include lanolin, liquid petrolatum, and fatty esters such as glyceryl and sorbitol monostearate. If such softeners are employed, greater concentrations of Viokase should be used or the product should be consumed soon after preparation to achieve the benefits of the invention.

The adverse effect of various gum softeners was shown by formol titrations to determine the enzymatic activity of aged chewing gum samples as follows:

Ten sticks (30 gms.) of each gum sample were frozen with Dry Ice, pulverized by mortar and pestle and placed in a large test tube containing .5 g. of casein. To the pulverized gum and casein was added 50 ml. of distilled water. The diluted samples were incubated at 37° C. with constant agitation for one hour. The pH of the solution was adjusted to between 7.0 and 7.2 with 1 N NaOH at 5 minutes, 20 minutes, 35 minutes and 50 minutes. The solution was then further diluted with 50 ml. of distilled water and adjusted to pH 8.0 with N/20 NaOH.

The content of amino acid resulting from breakdown of casein provides a measure of the proteolytic activity of the enzyme present in the test sample. Amino acid content was determined by the Sorenson formol titration method modified as follows: Formaldehyde (80 ml.) was added to the incubated sample and the solution was again adjusted to pH 8.0 by titration with N/20 NaOH. The amount of NaOH required to bring the solution to pH 8.0 is subtracted from the volume required to bring 80 ml. of formaldehyde to pH 8.0 and the difference is expressed in formol units.

Table I below sets forth the values obtained with various samples aged at room temperature for a total of five weeks.

TABLE I

| Formula | Formol Units (Weeks) | | | |
|---|---|---|---|---|
| | (2) | (3) | (4) | (5) |
| 1. Chewing gum base [1] (27 parts), Liquid petrolatum (1 part)—21.2%; Sugar—58.2%; Corn Syrup—18.1%; Flavor—1.0%; Viokase—1.5% | 21.2 | 21.2 | 20.4 | 18.0 |
| 2. Same as (1) but sorbitan monostearate replaces petrolatum | 21.0 | 20.3 | 20.2 | 18.0 |
| 3. Same as (1) but lanolin replaces petrolatum | 20.4 | 21.4 | 20.0 | 15.6 |
| 4. Same as (1) but petrolatum omitted (Control) | 20.4 | 20.4 | 20.4 | 20.2 |

[1] Clark Bros. C-100 as more fully defined in Example V.

It can be seen that Formulas 1, 2, and 3, containing as softeners, liquid petroleum, sorbitan monostearate, and lanolin, respectively, have substantially diminished proteolytic activity after five weeks of aging under normal storage conditions, whereas Formula 4 which contains no softeners maintains a high level of activity.

Because of the stability of the active in the chewing gum vehicle, many of the inactivating influences to which enzyme systems are frequently susceptible do not present a problem, e.g., Viokase remains active after exposure to relatively high temperatures, over a wide pH range and in the presence of large amounts of water.

*Example I*

A chewing gum is prepared having the following composition:

I. Gum base _____ percent__ 21.3
   Latex (60%) _____ parts__ 18
   Hydrogenated rosin ester _____ do____ 44
   Paracumarone resin _____ do____ 7.5
   Candelilla wax _____ do____ 6
   Ethyl cellulose _____ do____ 2
   Calcium carbonate _____ do____ 20
II. Sugar _____ percent__ 58
III. Corn syrup (Baumé 45) _____ do____ 18.2
IV. Flavoring material, q.v.
V. Viokase _____ do____ 2.5

The ingredients are mixed in accordance with methods ordinarily employed in the art. The resulting product demonstrates a high initial level of proteolytic activity which remains substantially undiminished for several months. Chewing this gum for as little as twenty-five minutes a day results in a substantial decrease in calculus formation.

*Example II*

A chewing gum is prepared having the same composition as that described in Example I except that 1% of Viokase is used and the gum is of the following composition:

Parts
Jelutong (dry) _____ 92
Paraffin wax (M.P. 168° F.) _____ 8

This product has a high level of proteolytic activity for several months and effects a substantial reduction in calculus when a standard five stick package is chewed each day.

*Example III*

A chewing gum is prepared as described in Examples I and II except that 5.0% of Viokase and a gum base with the following composition is used.

Parts
Estergum _____ 30
Coumarone resin _____ 45
Latex (dry) _____ 15
Paraffin wax (M.P. 180° F.) _____ 10

The chewing gum thus formulated is enzymatically active and stable for several months. A marked reduction in calculus is observed when this gum is chewed each day.

*Example IV*

A chewing gum is prepared according to the formulation of Example I, replacing the gum base with one of the following compositions:

Parts
Washed pontianac gum _____ 46.7
Washed gutta katian _____ 44
Washed gutta soh _____ 8.3
Candelilla wax _____ 1

This chewing gum also demonstrates high levels of activity, is stable, and effectively inhibits the formation of calculus.

*Example V*

The chewing gum base of Example I is replaced by a commercially prepared base, Clark Bros. C-100. This base is similar to the base of Example I except that hydrogenated cottonseed oil and estergums replace ethyl cellulose and calcium carbonate and the Viokase concentration is 2.0%. This product demonstrates activity comparable to the formulations of the foregoing examples.

It is to be understood that the foregoing examples are merely illustrative of the type of formulations which are compatible with Viokase and can be used for the purpose of this invention. Other materials commonly employed in chewing gum bases and which are compatible with Viokase include natural gums such as chilte, chicle, gum acacia, gutta hang kang, lechi caspi, leche de vaca, massaranduba, balata, and several others known and used in the art. All of the natural waxes and synthetic resins may also be employed. Flavoring agents such as yakima spearmint, oil of wintergreen, oil of peppermint, licorice, fruit flavors, etc., or sweetening agents such as sugars, including dextrose, sucrose, and/or artificial sweeteners such as cyclomates or saccharin may also be incorporated in the gum base.

The calculus inhibiting effect of a chewing gum composition of this invention containing Viokase as the calculus inhibiting agent was determined as follows: 20 people who had a history of excessive calculus formation were selected. At the outset, existing calculus was removed from the teeth of these people by manual means. Half of the subjects were given the chewing gum of Example V and half a chewing gum of the same composition, but without Viokase. All of the panel members were instructed to chew five sticks of the gum per day, each stick for a period of five minutes, for a total daily chewing time of about 25 minutes. After eight weeks the subjects were recalled and graded for new calculus formation and these deposits were removed. Those who had used the test gum during this interval received the control gum which they used in the same fashion for a second period of eight weeks. Those subjects who had used the control gum for the first period, used the test gum for the second period. The results of the study are tabulated below.

| Subject | Control | Test | Calculus Surface Index [1] C minus T |
|---|---|---|---|
| A | 2 | 4 | −2 |
| B | 6 | 3 | 3 |
| C | 11 | 5 | 6 |
| D | 7 | 3 | 4 |
| E | 6 | 7 | −1 |
| F | 7 | 6 | 1 |
| G | 1 | 1 | 0 |
| H | 7 | 2 | 5 |
| I | 2 | 3 | −1 |
| J | 0 | 1 | −1 |
| K | 6 | 1 | 5 |
| L | 0 | 1 | −1 |
| M | 1 | 4 | −3 |
| N | 7 | 5 | 2 |
| O | 9 | 4 | 5 |
| P | 1 | 6 | −5 |
| Q | 4 | 0 | 4 |
| R | 8 | 5 | 3 |
| S | 2 | 0 | 2 |
| T | 2 | 0 | 2 |
| Totals | 89 | 61 | 28 |
| Mean | 4.45 | 3.05 | 1.40 |

[1] Each of the four mandibular incisors was considered on the basis of four surfaces: 1 labial, 1 lingual and 2 proximal. Upon examination, a numerical value representing the number of surfaces showing calculus was recorded as the calculus surface index.

It will be observed that a 30% overall decrease in calculus resulted when the composition of this invention was used.

All parts and percentages in the specification and claims are by weight.

I claim:
1. A calculus-inhibiting chewing gum consisting essentially of a chewing gum base selected from the group consisting of natural and synthetic gums and waxes and from about 0.1% to about 10% of pancreatin derived by simultaneously defatting and drying by azeotropic distillation of water pancreatic biological substance, using a water-immiscible fat solvent, and maintaining a temperature below 60° C., by first converting said pancreatic substance into fluid pumpable form, then introducing said fluid substance in the form of droplets into a boiling body of said solvent, removing the water from said pancreatic substance in the form of an azeotrope with said solvent, and recovering the dry, defatted pancreatic substance, said chewing gum being essentially free of gum softeners.

2. A calculus-inhibiting chewing gum in accordance with claim 1 in which the pancreatin constitutes 2% of the total composition.

3. The method of reducing the formation of dental calculus comprising exposing the dental surfaces to a chewing gum enzymatically activated through the incorporation therein of pancreatin derived by simultaneously defatting and drying by azeotropic distillation of water pancreatic biological substance, using a water-immiscible fat solvent, and maintaining a temperature below 60° C., by first converting said pancreatic substance into fluid pumpable form, then introducing said fluid substance in the form of droplets into a boiling body of said solvent, removing the water from said pancreatic substance in the form of an azeotrope with said solvent, and recovering the dry, defatted pancreatic substance, said chewing gum being essentially free of gum softeners.

References Cited by the Examiner

UNITED STATES PATENTS

| | | | |
|---|---|---|---|
| 1,133,250 | 3/1915 | Ruthrauff | 167—93 |
| 1,386,252 | 8/1921 | Green | 167—93 |
| 1,386,627 | 8/1921 | Keator | 167—93 |
| 2,619,425 | 11/1952 | Levin | 167—74 X |

OTHER REFERENCES

Jensen: The Journal of the American Dental Association, vol. 59, No. 1, July 1959, pages 923–930.

LEWIS GOTTS, *Primary Examiner.*

FRANK CACCIAPAGLIA, JR., *Examiner.*